US012748008B2

(12) United States Patent
Iizuka

(10) Patent No.: US 12,748,008 B2
(45) Date of Patent: Sep. 29, 2026

(54) VALVE SEAT INSPECTION METHOD AND VALVE SEAT INSPECTION DEVICE USING IMAGE RECOGNITION CAMERA

(71) Applicant: KITZ CORPORATION, Tokyo (JP)

(72) Inventor: Ryo Iizuka, Yamanashi (JP)

(73) Assignee: KITZ CORPORATION, Tokyo (JP)

( * ) Notice: Subject to any disclaimer, the term of this patent is extended or adjusted under 35 U.S.C. 154(b) by 273 days.

(21) Appl. No.: 18/720,303

(22) PCT Filed: Dec. 22, 2022

(86) PCT No.: PCT/JP2022/047280
§ 371 (c)(1),
(2) Date: Jun. 14, 2024

(87) PCT Pub. No.: WO2023/120621
PCT Pub. Date: Jun. 29, 2023

(65) Prior Publication Data
US 2025/0044177 A1 Feb. 6, 2025

(30) Foreign Application Priority Data
Dec. 24, 2021 (JP) ................................ 2021-211027

(51) Int. Cl.
*G01M 3/08* (2006.01)

(52) U.S. Cl.
CPC .................................. *G01M 3/086* (2013.01)

(58) Field of Classification Search
CPC .......... G01M 3/086; G01M 3/38; Y02E 30/30
See application file for complete search history.

(56) References Cited

U.S. PATENT DOCUMENTS

2002/0075984 A1* 6/2002 Knecht .................. G21C 17/07
376/253
2008/0238957 A1 10/2008 Hayashi

FOREIGN PATENT DOCUMENTS

CN 107219042 9/2017
CN 210243104 4/2020
(Continued)

OTHER PUBLICATIONS

International Search Report issued Feb. 21, 2023 in International Application No. PCT/JP2022/047280.
(Continued)

*Primary Examiner* — David J Bolduc
(74) *Attorney, Agent, or Firm* — Wenderoth, Lind & Ponack, L.L.P.

(57) ABSTRACT

A valve seat inspection method and valve seat inspection device using an image recognition camera. An inspection device main body has a checkup circuit for checking a leak with a reference leak amount, an inspection circuit in a state in which a test valve is set, and an image recognition camera for taking an image of bubbles appearing from a tip of an inspection tube being inserted into water in a container. The inspection device main body goes through a checkup process of switching a circuit switching part and making a pass/fail determination by the image recognition camera as to whether bubbles appear from the tip of the inspection tube in a checkup time and an inspection process of switching the circuit switching part and making a pass/fail determination by the image recognition camera as to whether bubbles appear from the tip of the inspection tube in an inspection time.

9 Claims, 10 Drawing Sheets

(56) References Cited

FOREIGN PATENT DOCUMENTS

| | | |
|---|---|---|
| JP | 62-49746 | 3/1987 |
| JP | 62-198727 | 9/1987 |
| JP | 7-260541 | 10/1995 |
| JP | 9-166514 | 6/1997 |
| JP | 3850273 | 11/2006 |
| JP | 2018-162999 | 10/2018 |
| KR | 10-0894440 | 4/2009 |
| WO | 2010/027437 | 3/2010 |

OTHER PUBLICATIONS

Extended European Search Report issued Nov. 12, 2025 in European Patent Application No. 22911323.8.

* cited by examiner

VALVE SEAT INSPECTION METHOD AND VALVE SEAT INSPECTION DEVICE USING IMAGE RECOGNITION CAMERA

TECHNICAL FIELD

The present invention relates to valve seat inspection methods on valves and, in particular, to a valve seat inspection method and valve seat inspection device using an image recognition camera capable of detecting, with high accuracy, a micro-leak amount from a valve seat by automatic inspection.

BACKGROUND ART

In general, after manufacturing a valve, a valve seat inspection is performed on the valve by a valve seat leak test to check whether the valve satisfies the criteria as a product.

When a general-purpose valve is subjected to a valve seat inspection by automation, an inspection method using air pressure is known. For example, when a ball valve is inspected for a valve seat leak, an inspection may be performed by using a valve seat inspection device including a flow sensor and a flow standard. In the valve seat inspection device, the flow standard, a solenoid valve for flow-path switching, a clamp for valve attachment, and the flow sensor for flow rate measurement are provided to a flow path for inspection. The flow standard is provided so as to adjust air pressure from an air pump provided on a primary side to a reference leak amount (pressure serving as a reference for leak inspection) for supply to a secondary side. The solenoid valve is provided so as to be able to switch air pressure from the flow standard to a state of being supplied or not supplied to a test valve side, the flow sensor is provided so as to be able to measure a valve seat leak amount from the test valve.

Before a valve seat inspection of a ball valve (test valve) is performed by the above-described valve seat inspection device, a checkup is normally performed as to whether settings of flow paths for inspection are appropriately set and the flow sensor is normally functioning. When the checkup is performed, compressed air adjusted to the reference leak amount is sent by the flow standard to the flow sensor, thereby performing the checkup on the flow sensor and the flow paths.

Next, when a valve seat inspection is performed, in a state in which both sides of the test valve are nipped by clamps, airflows (leak amount from the valve seat) occurring from both sides of the test valve in a valve-closed state with pressure encapsulated inside a cavity are measured by the flow sensor.

On the other hand, in PTL 1, a technique regarding an airtightness inspection method using a work airtightness inspection device is disclosed. In the inspection device, a camera for image recognition is used to inspect airtightness of a work formed of a hollow container. The inspection device includes a work disposing device having a capsule for work accommodation formed of a capsule lid and a capsule main body, a supply air path coupled to a pressurizing device for supply air to an inner space of the work, and air inflow path for pressurizing the space inside the capsule and an air outflow path for letting air inside the capsule flow outside; and an air bubble check device formed of an air bubble measurement device for measuring air from the air outflow path through a liquid reservoir and the air bubble measurement device as air bubbles. As one example of the air bubble measurement device, a video camera and a lighting device are combined, and air bubbles occurring in the liquid reservoir are detected by the video camera.

When an airtightness inspection of a work is performed, the work is accommodated inside the capsule, and the inside of the capsule is pressurized in advance from the air inflow path. In a stage of increasing the pressure inside the capsule and inside the pipeline, the inner space of the work is pressurized by the pressurizing device to cause air inside the capsule to occur as air bubbles into liquid inside the liquid reservoir. Air bubbles occurring at this moment are detected by the video camera, and the amount of occurrence of air bubbles is compared with an air bubble amount in a case of no leak set in advance to determine airtightness of the work.

Also, in the leak-amount measurement device of PTL 2, leaks from the valve are accumulated in a container (cylinder) by downward displacement of water, the fluid level inside the cylinder decreased by the accumulated leaked fluid is measured by an ultrasonic sensor, and leak amount is measured from a change in the water level.

Meanwhile, valve products are each required to pass the above-described valve seat leak test based on the criteria defined in predetermined standards. In particular, in valves for industrial purposes (hereinafter referred to as "industrial valves") where a chemical-based fluid flows, high seal performance is required, compared with valve for general purposes (hereinafter referred to as "general-purpose valves") such as those for water supply and hot-water supply. In this case, to achieve higher leak prevention performance as industrial valves, the valves are required to be tested based on strict determination criteria.

Here, when a valve seat inspection of a valve is performed, an inspection method is generally performed in which the valve supplied with air inside is immersed in water and leaked bubbles are checked by an operator by visual inspection to determine the presence or absence of a valve seat leak.

CITATION LIST

Patent Literatures

PTL 1: Japanese Patent No. 3850273
PTL 2: Japanese Unexamined Patent Application Publication No. 7-260541

SUMMARY OF INVENTION

Technical Problem

However, when a valve seat leak of the valve is determined by visual inspection, operators are required to be well-experienced, and there is also a possibility that the determination result varies for each operator and a valve seat leak may be missed. In addition to this, there are also problems in which automation of valve seat inspection cannot be made and the valve seat inspection of each valve takes time.

On the other hand, when a valve seat inspection of an industrial valve is performed by a valve seat inspection device using a flow sensor, the flow sensor is required to have detection ability capable of measuring a subtle leak amount to the extent of being not confirmed by visual inspection, for example, a subtle leak amount equal to or smaller than a leak amount of 0.2 mL/min.

However, the minimum measurement capability of the general-purpose flow sensor is often larger than 0.2 mL/min, and general-purpose flow sensors capable of measuring an ultra-micro leak amount equal to or smaller than 0.2 mL/min are hardly present. Thus, in the valve seat inspection device using a general-purpose flow sensor, compared with a case in which a valve seat inspection is performed by immersion in water and visual inspection, valve seat leak resistance performance of industrial valves or the like requiring high sealability cannot be ensured. In contrast to this, if a highly-accurate flow sensor capable of measuring a flow rate equal to or smaller than 0.2 mL/min is tried to be provided, this is not practical because problems arise in which, for example, the inner structure becomes complex and the inspection device becomes increased as a whole to make facilities complex and, furthermore, cost required for calibration of the flow sensor and so forth increases.

When a checkup is performed as to whether the flow sensor is normally functioning, the flow sensor is required to have high accuracy. Therefore, the issue in which calibration is very difficult is also occurred.

The work airtightness inspection device of PTL 1 takes a hollow container in a hermetically-sealed state as a test target subject, causes a leak from the hollow container to be generated as air bubbles and measures the amount thereof, and compares the air bubble amount with an air bubble amount set in advance for inspection, thereby inspecting airtightness of the hollow container. In the inspection device, a difference in the amount of air bubbles from the hollow container when air is continuously added from outside is detected by the video camera, and only the presence or absence of occurrence of a leak is measured. A subtle leak amount from the work cannot be measured by the video camera. Thus, it is difficult to use this inspection device as an inspection device for inspecting a subtle valve seat leak of an industrial valve or the like.

In addition to this, when an airtightness inspection is performed by the inspection device of PTL 1, the work is supported and fixed inside the capsule and, while a tip side of a pipeline provided on a capsule lid side and coupled to the pressurizing device is integrally coupled to an opening of the work in a hermetically-sealed state, the capsule lid is required to be attached to the capsule main body in a hermetically-sealed state. In this manner, the attachment/removal structure of the work is complex and it is also required to pressurize the inside of the capsule in advance for each work to set a predetermined pressure. Thus, automation of inspection is difficult, and successive valve seat inspections of works are also difficult.

Also, PTL 2 has a problem where an ultrasonic sensor with high accuracy is required to measure the fluid level in the cylinder, thereby further making the inspection device complex. In addition to this, when an inspection is performed by using a sensor for measuring a physical amount of the ultrasonic sensor or the like, it is required to accurately measure a measurement value to correctly make an inspection pass/fail determination, and it is thus required also to perform a fine calibration and adjustment of the sensor. Moreover, a function may be required for making a comparison between the measurement value and a determination value of a leak amount as a pass/fail criterion for determination.

From these, development of a valve seat inspection method and valve seat inspection device has been desired in which, without performing a valve seat inspection by visual inspection by immersing a valve in water, the inspection accuracy equivalent to that of the visual inspection is provided and valves required to have high valve seat performance such as industrial valves can be automatically and successively inspected.

The present invention was developed to solve the conventional problem, and has an object of providing a valve seat inspection method and valve seat inspection device using an image recognition camera, the valve seat inspection method capable of successively performing valve seat inspections of valves by automatic inspection in a simple structure, in which even for a valve requiring high valve seat leak resistance performance such as an industrial valve, not a sensor with high accuracy but an image recognition camera is used to detect even a subtle leak amount from the valve seat with high accuracy and with ease and inspection accuracy equivalent to that when a valve seat inspection of a valve in a state of being immersed in water is visually performed by visual inspection can be achieved.

Solution to Problem

To achieve the above-described object, an invention according to claim 1 is directed to a valve seat inspection method using an image recognition camera, in which an inspection device main body is provided including a checkup circuit for checking a leak with a reference leak amount, an inspection circuit in a state in which a test valve is set, and the image recognition camera for taking an image of bubbles appearing from a tip of an inspection tube being inserted into water in a container, the inspection device main body goes through a checkup process of switching a circuit switching part and making a pass/fail determination by the image recognition camera as to whether bubbles appear from the tip of the inspection tube in a checkup time and an inspection process of switching the circuit switching part and making a pass/fail determination by the image recognition camera as to whether bubbles appear from the tip of the inspection tube in an inspection time.

An invention according to claim 2 is directed to the valve seat inspection method using the image recognition camera, in which as an upstream process of each of the checkup process and the inspection process, at least any or all of a water level determination by image processing, a water level determination by a weight sensor, a large-leak determination by a flow sensor, and a determination by image processing as to insertion depth of the inspection tube are performed.

An invention according to claim 3 is directed to the valve seat inspection method using the image recognition camera, in which low-pressure air is blown to the inspection tube to discharge water attached to the inspection tube tip.

An invention according to claim 4 is directed to the valve seat inspection method using the image recognition camera, in which a step of inserting the tip of the inspection tube into water and a step of exposing to atmosphere are operated by an operation mechanism part.

An invention according to claim 5 is directed to the valve seat inspection method using the image recognition camera, in which a non-reflective paint for preventing light reflection is applied to the inspection device main body and its inner wall to obtain detection capability of the image recognition camera.

An invention according to claim 6 is directed to a valve seat inspection device using an image recognition camera, the device including: a checkup circuit for checking a leak with a reference leak amount; an inspection circuit in a state in which a test valve is set; the image recognition camera for taking an image of bubbles appearing from a tip of an inspection tube communicating the inspection circuit in a state of being inserted into a container filled with water; a circuit switching part for switching between the checkup circuit and the inspection circuit; and an operation mechanism part for inserting the inspection tube into water and exposing the inspection tube to atmosphere.

An invention according to claim 7 is directed to the valve seat inspection device using the image recognition camera, in which the image recognition camera makes at least a leak determination based on presence or absence of bubbles appearing from the tip of the inspection tube, a water level determination in the container, and a determination as to insertion depth of the inspection tube.

An invention according to claim 8 is directed to the valve seat inspection device using the image recognition camera, in which the operation mechanism part is a vertically-operative linear servo mechanism.

An invention according to claim 9 is directed to the valve seat inspection device using the image recognition camera, in which a low-pressure air blowing part is provided to the inspection tube to discharge water attached to the tip of the inspection tube.

Advantageous Effects of Invention

From the invention according to claim 1, the simple structure makes it possible to successively perform valve seat inspection of valves by automatic inspection. Even if high valve seat leak resistance performance is required in an industrial valve or the like, by using not a sensor with high accuracy but a simple image recognition camera, even a subtle leak amount from the valve seat can be detected with high accuracy and with ease. In this case, by taking an image of bubbles by the image recognition camera, as with a case in which a valve seat inspection is performed by visual inspection on the valve in a state of being immersed in water, it is possible to visually detect a leak, and it is also possible to perform an inspection along predetermined standards so that inspection accuracy equivalent to that of the water-immersion visual inspection can be achieved. With this, even if the determination criteria as to a valve seat leak is strict, it is possible to very accurately make a pass/fail determination as a valve product. Furthermore, in the checkup process, the state of a leak with a reference leak amount can be easily subjected to checkup in advance and this checkup makes the inspection process possible to be performed more accurately. Still further, in either process of the checkup process and the inspection process, with the inspection tube being in a state of being exposed to the atmosphere, the circuit switching part can be switched. Thus, it is possible to perform a checkup and an inspection in a state in which the influence of an airflow inside the inspection tube and the influence due to a difference in pressure between outside air (atmospheric pressure) and pressure inside the inspection tube are suppressed to minimum, and provide a high-quality valve with a valve seat leak suppressed to the ultimate.

From the invention according to claim 2, as an upstream process of each of the checkup process and the inspection process, when a water level determination by image processing and a water level determination by a weight sensor are each performed, the container is replenished with water or water therein is removed in accordance with the results of these determinations to adjust the amount of water in each process to a constant amount. With this, water pressure applied when bubbles appear from the tube tip can be kept constant. When a large-leak determination on the flow sensor is made, a large leak from the test valve is confirmed in accordance with the determination result and the valve can be removed as a failed product before the inspection process. When a determination as to the insertion depth of the inspection tube by image processing is made, the depth of the tip position of the inspection tube is adjusted in accordance with the determination result, and water pressure applied when bubbles appear from the tube tip can be kept constant. By making each of these determinations, in both of the checkup process and the inspection process, it is possible to keep each condition for each test valve constant and perform a valve seat inspection with extremely high accuracy.

From the invention according to claim 3, by blowing low-pressure air to the inspection tube to discharge water attached to the inspection tube tip, it is possible to cause the inner side and the outside air side (atmospheric side) when an inspection tube tip side is exposed to the atmosphere to reliably communicate and, with the inside of the checkup circuit and the inside of the inspection circuit being ensured to be in a state of atmospheric pressure, it is possible to switch the circuit switching part to perform accurate checkup and inspection.

From the invention according to claim 4, the step of inserting the tip of the inspection tube into water and the step of exposing to atmosphere can be automated by operation of the operation mechanism part. In either step, the tip of the inspection tube can be accurately arranged at a predetermined position from the water surface. With this, in the checkup step, the inspection step, and the upstream step of each of these steps, the influence of atmospheric pressure at the time of attachment/removal of the test valve can be suppressed as much as possible, and an accurate valve seat inspection can be performed.

From the invention according to claim 5, the non-reflective paint for preventing light reflection is applied. This can increase each difference in luminance between the inspection device main body and its inner wall applied with the non-reflective paint, and a tip side of the inspection tube and bubbles appearing on the tip side and the water surface of water in the container to significantly improve performance for detecting bubbles appearing from the inspection tube tip side and also easily measure the water level of the water in the container.

From the invention according to claim 6, the device can be provided so as to be able to successively perform valve seat inspections of valves by automatic inspection in a simple structure. Even if high valve seat leak resistance performance is required in an industrial valve or the like, by using not a sensor with high accuracy but a simple image recognition camera, even a subtle leak amount from the valve seat can be detected with high accuracy and with ease. In this case, by taking an image of bubbles by the image recognition camera, as with a case in which a valve seat inspection is performed by visual inspection on the valve in a state of being immersed in water, it is possible to visually detect a leak, and it is also possible to perform an inspection along predetermined standards so that inspection accuracy equivalent to that of the water-immersion visual inspection can be achieved. With this, even if the determination criteria as to a valve seat leak is strict, it is possible to very accurately make a pass/fail determination as a valve product. Furthermore, the state of a leak with a reference leak amount of the checkup circuit can be subjected to checkup in advance with ease, and the checkup makes the inspection possible to be performed more accurately. Still further, with the inspection tube being in a state of being exposed to the atmosphere, the circuit switching part can be switched by the operation mechanism part. Thus, it is possible to perform a checkup and an inspection in a state in which the influence of an airflow inside the inspection tube and the influence due to a difference in pressure between outside air (atmospheric pressure) and the pressure inside the inspection tube are suppressed to minimum, and provide a high-quality valve with a valve seat leak suppressed to the ultimate.

From the invention according to claim 7, at least a leak bubble determination, a water level determination, and a determination as to the insertion depth of the inspection tube can be made by using only the image recognition camera. Thus, the equipment to be used for a valve seat leak can be suppressed to minimum, and the entire structure can be simplified. In both cases of checkup and inspection, it is possible to keep each condition for each test valve constant and perform a valve seat inspection with extremely high accuracy.

From the invention according to claim 8, the operation mechanism part is formed of a linear servo mechanism to become in a simple structure, thereby being incorporated easily. By the linear servo mechanism, insertion of the tip of the inspection tube into water and exposure to the atmosphere are automated. In both cases, while fine vibrations are prevented, the inspection tube can be vertically moved at high speeds and with high accuracy to quickly perform control with precision, and the tip of the inspection tube can be accurately arranged at a predetermined position from the water surface.

From the invention according to claim 9, by blowing low-pressure air from the low-pressure air blowing part to the inspection tube to discharge water attached to the insertion tube tip, it is possible to cause the inner side and the outside air side (atmospheric side) when an inspection tube tip side is exposed to the atmosphere to reliably communicate and, with the inside of the checkup circuit and the inside of the inspection circuit being ensured to be in a state of atmospheric pressure, it is possible to switch the circuit switching part.

DESCRIPTION OF EMBODIMENTS

In the following, an embodiment of a valve seat inspection method and valve seat inspection device using an image recognition camera in the present invention is described in detail, based on the drawings. In FIG. 1 to FIG. 5, one embodiment of the valve seat inspection device using the image recognition camera is depicted, and the valve seat inspection device is first described based on these drawings.

Figure 5:
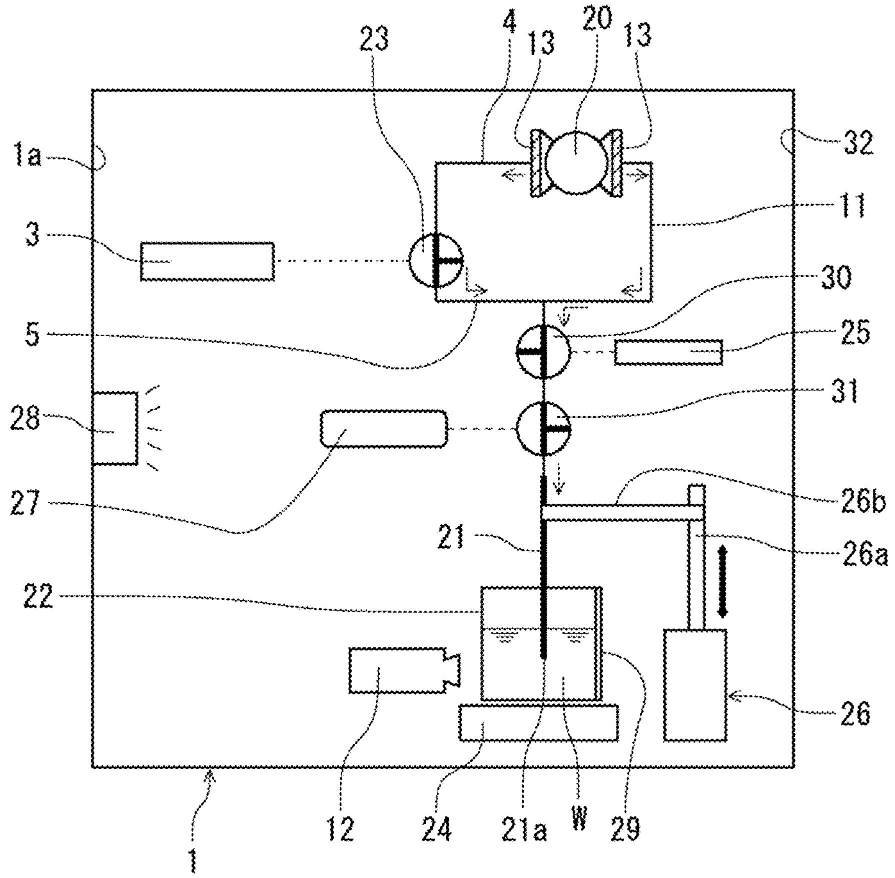
FIG. 5 is a circuit diagram depicting a state at the time of an inspection process of the valve seat inspection device.

In the drawings, the valve seat inspection device (hereinafter, inspection device main body 1) includes an air circuit 2 inside of which air flows. In the vicinity of a primary side of the air circuit 2, a flow standard 3 is provided. On a secondary side of the flow standard 3, a first branch path 4 and a second branch path 5 are provided so as to be branched and, after that branching, merged again to form a closed circuit. In the inspection device main body 1, a checkup circuit 10 for checkup depicted in FIG. 3 or an inspection circuit 11 for valve seat leak inspection depicted in FIG. 5 are provided so as to be able to be formed by switching of the air circuit 2, and the inspection device main body 1 has these checkup circuit 10 and inspection circuit 11, and an image recognition camera 12. In the air circuit 2, solid lines each represent a communication state and broken lines each represent a shutoff state of a flow path.

At an appropriate position of the second branch path 5, a jig 13 formed of a clamp member is provided. With the jig 13, a test valve 20 as a target for valve seat leak inspection is provided so that its both ends can be connected.

The inspection device main body 1 further includes an inspection tube 21, a container 22, a circuit switching part 23, a weight sensor 24, a flow sensor 25, an operation mechanism part 26, a low-pressure air blowing part 27, and a lighting fixture 28. The inspection device main body 1 is provided so as to make, in a state in which both ends of the test valve 20 are nipped by the jig 13 and pressure is encapsulated inside a cavity, not depicted, of the test valve 20 in a valve-closed state, a determination as to a valve seat leak from both sides with the image recognition camera to make a pass/fail determination.

As the image recognition camera 12, an industrial camera is used. The image recognition camera 12 has a function capable of taking (triggering) still images at least every predetermined time and is arranged at a position and to an orientation allowing images of bubbles (leak bubbles) appearing from a tip 21a of the inspection tube 21 to be taken in a state in which the inspection tube 21 communicating to the inspection circuit 11 is inserted into a container 22 filled with water W. With this, the image recognition camera 12 is provided so as to be able to, in a checkup process and an inspection process described further below, make a determination as to leak bubbles for making a pass/fail determination from the result of taking images so as to know whether bubbles appear from the tip 21a of the inspection tube in a state of being inserted into water W in the container 22 within a time and, in addition, make a determination as to the water level in the container 22 and a determination as to the insertion depth of the inspection tube 21.

While a determination as to whether bubbles appear from the tip of the inspection tube 21, a water-level determination by image processing, and a determination as to the insertion depth of the inspection tube by image processing are made by one image recognition camera 12 in the present embodiment, a plurality of image recognition cameras may be used (not depicted in the drawings).

The flow standard 3 is provided on the primary side of the air circuit 2, and an air supply source not depicted is provided on a primary side of the flow standard 3. The flow standard 3 is provided so as to be able to adjust air pressure from the air supply source to a pressure serving as a reference for leak inspection, that is, a reference leak amount, and supply the adjusted pressure to a secondary side.

Figure 3:
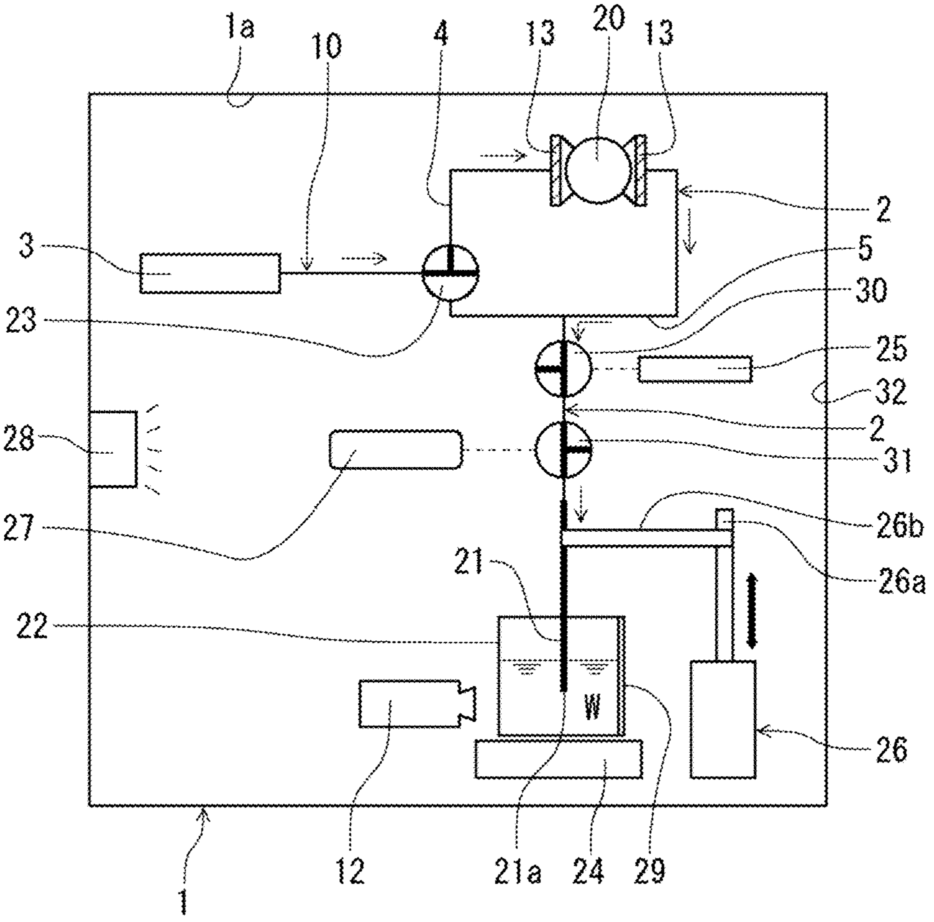
FIG. 3 is a circuit diagram depicting a state at the time of a checkup process of the valve seat inspection device.

The checkup circuit 10 is configured in the air circuit 2 by a circuit indicated by a solid line in FIG. 3 by switching the circuit switching part 23, and is provided so that a leak of the reference leak amount can be checked in advance by the checkup circuit 10 when a valve seat leak inspection is performed.

The inspection circuit 11 is configured in the air circuit 2 by a circuit indicated by a solid line in FIG. 5 by switching the circuit switching part 23, and is provided so that the test valve 20 can be installed in the inspection circuit 11. This circuit is provided so that, after a checkup by the checkup circuit 10, an inspection as to a valve seat leak of the test valve 20 can be performed by the inspection circuit 11.

The inspection tube 21 is provided to have a predetermined length and inner diameter so as to be able to let air of a flow rate of at least 0.2 mL/min flow inside. Here, in the present embodiment, the flow rate of 0.2 mL/min exemplarily indicates a subtle leak amount that cannot be confirmed by visual inspection, indicating substantially no leak, and is not limited to the above-described numerical value. One end of the inspection tube 21 is connected to an air exit side in the air circuit 2, and the tip 21*a*, which is the other end side, is provided so as to be able to move up and down by an operation mechanism part 26, which will be described further below, to be insertable into the container 22. The material of the inspection tube 21 in the present embodiment is resin or glass, and its color is transparent or white so as to reflect light.

The container 22 is formed of a transparent material, and is arranged, in a state in which its inside is filled with a predetermined amount of water W, at a lower position of the inspection tube 21 in a state of being mounted on the weight sensor 24. As the container 22, for example, a glass-made transparent beaker is used. On the opposite side of a lighting side of the container 22 by the lighting fixture 28, a black non-reflective material 29 provided in a thin plate shape is laminated. With the non-reflective material 29, reflection of light from the lighting fixture 28 is prevented.

The circuit switching part 23 is provided as a three-way solenoid electromagnetic valve, and is arranged at a branching point between the first branch path 4 and the second branch path 5. By the circuit switching part 23, switching is made between the checkup circuit 10 and the inspection circuit 11 of the air circuit 2. When the flow path is switched to the first branch path 4 by the circuit switching part 23, the above-described checkup circuit 10 is configured. On the other hand, when the flow path is switched to the second branch path 5, the above-described inspection circuit 11 is configured.

The weight sensor 24 is provided so as to be able to have the container 22 filled with water W mounted thereon to measure its weight, and is provided so as to be able to measure the water level of water W from its measured weight.

In the air circuit 2, on a secondary side of the merging point between the first branch path 4 and the second branch path 5, switching valves 30 and 31 formed of three-way solenoid electromagnetic valves are disposed in this sequence. The flow sensor 25 is connected to a branching portion of the switching valve 30, and the low-pressure air blowing part 27 is connected to a branching portion of the switching valve 31, respectively. Switching by the switching valves 30 and 31 allow communication to the flow sensor 25 and the low-pressure air blowing part 27 sides, respectively. In the switching valves 30, 31 and the circuit switching part 23 depicted in FIG. 1 to FIG. 5, only the communication flow paths inside theses are schematically depicted, and the other flow paths are omitted.

Figure 2:
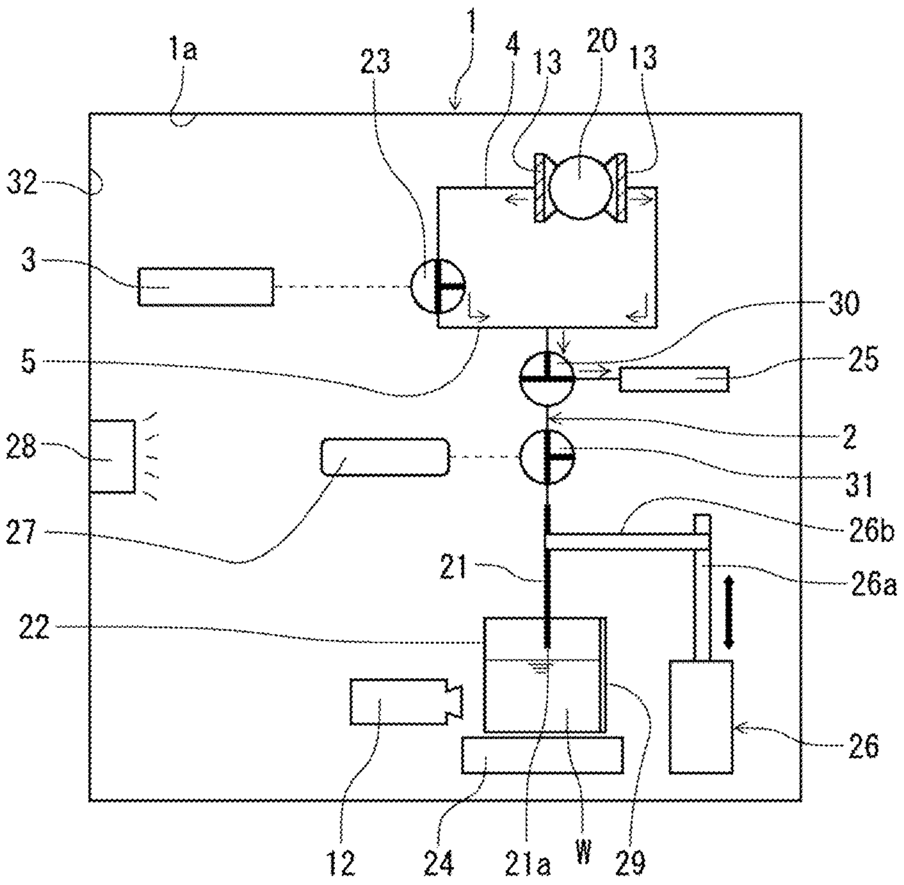
FIG. 2 is a circuit diagram depicting a state at the time of a large-leak determination by a flow sensor.

The flow sensor 25 is a flowmeter capable of measuring a flow rate (mL/min) per unit time of air flowing through the air circuit 2 and, when the switching valve 30 is switched to the state depicted in FIG. 2 to configure a flow path, measures leaks flowing out through the first branch path 4 and the second branch path 5 from both sides of the test valve 20 indicated by arrows. With these leaks, it is possible to determine a state of a leak with a large flow rate from the test valve 20, that is, a large leak. In the checkup process and the inspection process, before a pass/fail determination is made as to whether bubbles appear from the tip 21*a* of the inspection tube by image determination, a determination is made in advance as failed based on a fast leak speed at the time of a large leak, thereby preventing the occurrence of floating of a large amount of bubbles from the inspection tube 21, which is considered to cause an erroneous determination.

In the present embodiment, a "large leak" indicates a flow rate larger than a flow rate when a determination is made by the image recognition camera 12 as to whether bubbles appear from the inspection tube tip 21*a* in the checkup process and the inspection process and, specifically, a leak amount larger than 0.2 mL/min.

As the flow sensor 25, a general-purpose inexpensive one having an appropriate detection range can be used. For example, one with general performance supporting a flow rate on the order of 0.25 mL/min can be used. In this case, when a flow with a flow rate equal to or larger than 0.25 mL/min flows through the test valve 20, a determination is made as a large leak.

Figure 4:
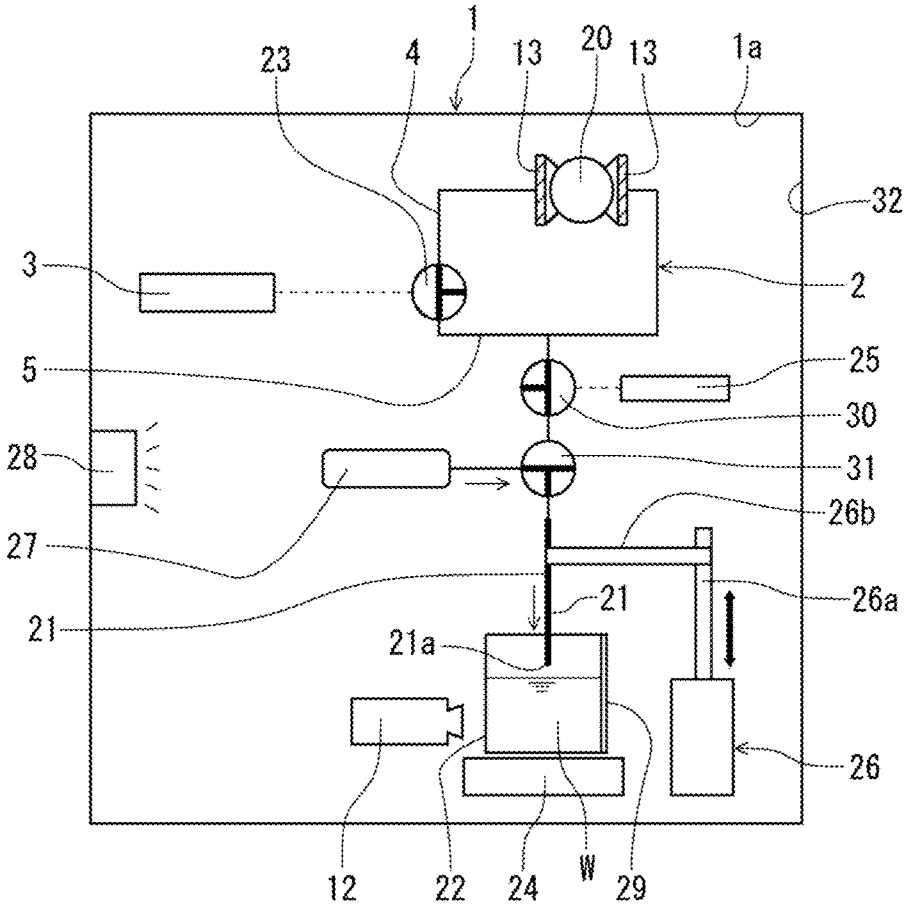
FIG. 4 is a circuit diagram depicting a state of clearing the inside of a tube of the valve seat inspection device.

The low-pressure air blowing part 27 is an air supply source capable of supplying low-pressure air for a short period of time and, specifically, is provided so as to supply air with a pressure equal to or lower than 0.1 MPa for one second or shorter. In FIG. 4, a state is depicted in which the switching valve 31 is switched to cause the flow paths of the low-pressure air blowing part 27 and the inspection tube 21 to communicate each other. When water W is attached to the inspection tube tip 21*a*, low-pressure air from the low-pressure air blowing part 27 provided to the inspection tube 21 in the state of FIG. 4 is blown to discharge water W attached to the inspection tube tip 21*a* to the outside. The magnitude of supply pressure of low-pressure air and its supply time can be set at any values as long as a subtle pressure can be supplied from the low-pressure air blowing part 27 for a short period of time.

The operation mechanism part 26 is formed of a vertically-operative linear servo mechanism. To a vertically-operative part 26*a* of the operation mechanism part 26, the inspection tube 21 is coupled via a coupling part 26*b*. With the structure, the inspection tube 21 vertically moves together with the vertically-operative part 26*a* when the operation mechanism part 26 is operated. The operation allows the inspection tube tip 21*a* side to be inserted into water W inside the container 22 and allows the inspection tube tip 21*a* to be extracted from water W inside the container 22 to be exposed to the atmosphere.

In the inspection device main body 1 and its inner wall 1*a*, non-reflective paint 32 for preventing reflection of light is applied. The non-reflective paint 32 and the above-described non-reflective material 29 prevent reflection of light from the lighting fixture 28 to obtain detection performance of the image recognition camera 12. The non-reflective paint 32 and the non-reflective material 29 are provided as, for example black.

The lighting fixture 28 is provided on a back surface side of the image recognition camera 12 at an appropriate height, for example, a height at which an image of light of the lighting fixture 28 reflected from the container 22 is not directly taken by the image recognition camera 12, and water W inside the container 22 is irradiated from the lighting fixture 28 with light in a forward light state to take an image of bubbles.

Although not depicted, a control part is connected to the inspection device main body 1. Via the control part, the following process are performed: control at the time of switching of the circuit switching part 23 and the switching valves 30 and 31; control of operation of the flow standard 3 and the operation mechanism part 26; measurement of a flow rate by the flow sensor 25 and a determination as to a large leak; control of image taking at predetermined times by the image recognition camera 12 and a determination as to a water level; measurement of weight by the weight sensor 24 and a determination as to a water level based on the weight; control of supply or stop of low-pressure air from the low-pressure air blowing part 27; a pass/fail determination in the preparation process, checkup process, and inspection process, and so forth. Furthermore, in the control part, various data for control including comparison data for determination, which will be described further below, are stored and, for example, compared with comparison data, thereby causing various determinations to be made. These various data pieces are provided so as to be updated and accumulated for each process.

The test valve 20 for valve seat inspection by the valve seat inspection device described above is formed of, for example, a ball valve and, in particular, the inspection device main body 1 is suitable when a ball valve in a relatively small size is subjected to valve seat inspection.

Next, the valve seat inspection method and operation by the valve seat inspection device using the image recognition camera described above are described. In FIG. 6 to FIG. 9, flowcharts of the valve seat inspection method in the present invention are depicted. The valve seat inspection method of the present invention includes a checkup process and an inspection process, performing a valve seat inspection of the test valve 20 by sequentially passing these processes. As an upstream process of each of these checkup process and inspection process, a preparation process is performed.

A pass/fail determination criterion in each of the checkup process and the inspection process is whether air flowing through each of the checkup circuit 10 and the inspection circuit 11 appears as bubbles from the tip 21*a* of the inspection tube 21 in a predetermined time. In the present embodiment, as its flow rate, 0.2 mL/min is used as a criterion. Thus, it is required to provide a length of the air circuit 2 so that an inspection can be performed to determine whether air with a flow rate of 0.2 mL/min appears as bubbles from the inspection tube tip 21*a* in a predetermined time. In the present embodiment, as will be described further below, the inspection time is set at 30 seconds, and the length of the air circuit 2 is set so that a valve seat leak inspection can be performed in the inspection time. The length of the air circuit 2 can be set as appropriate in accordance also with the type and size, such as bore diameter, of the test valve 20, a reference leak amount serving as a leak determination criteria, and so forth. Furthermore, in the present embodiment, the flow path of the inspection circuit 11 is provided to be long compared with the checkup circuit 10.

Figure 6:
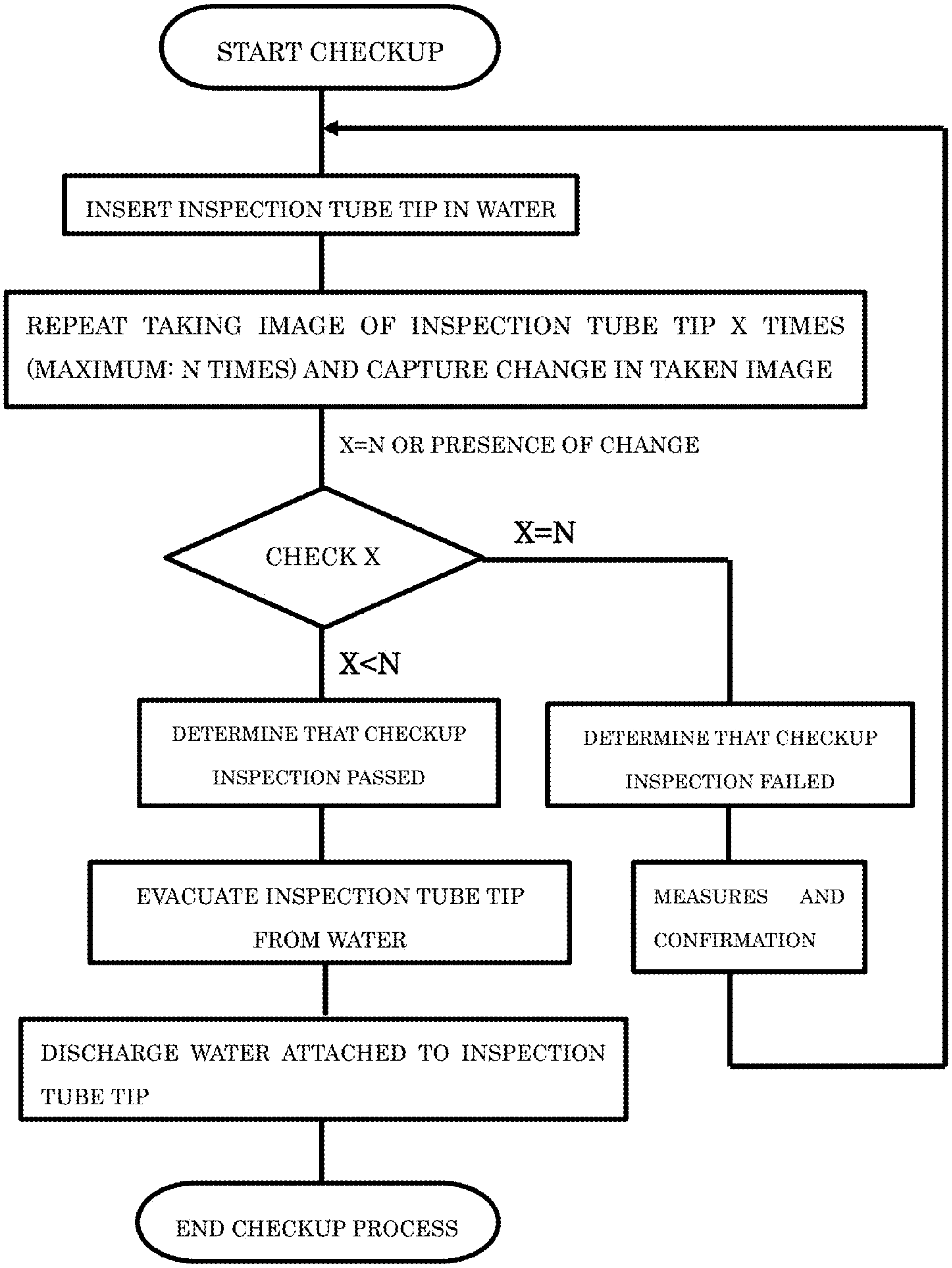
FIG. 6 is a flowchart representing a checkup process in a valve seat inspection method using an image recognition camera of the present invention.

In a flowchart depicted in FIG. 6, the checkup process is depicted from start to end. When a series of valve seat inspection is performed by the inspection device main body 1, the checkup process is first performed only once, and then only the inspection process is repeatedly performed in accordance with the number of test valves 20 to be inspected. In this manner, by performing the checkup process before the inspection process in advance, it is possible to accurately perform a valve seat leak inspection in the inspection process.

Figure 1:
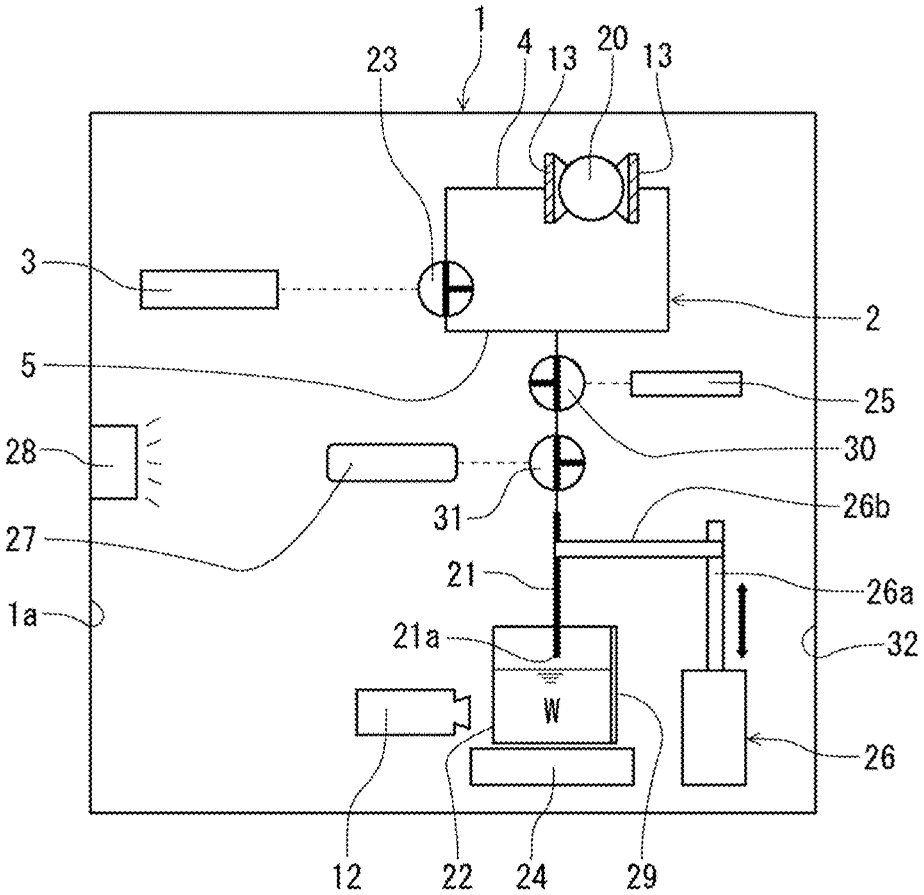
FIG. 1 is a circuit diagram depicting one embodiment of a valve seat inspection device.

In FIG. 1, before the checkup process, the test valve 20 for valve seat inspection or a dummy valve (not depicted in the drawing) is attached to the first branch path 4 of the air circuit 2 with the jig 13. The test valve 20 is set in a full-open state, and then the preparation process depicted in a flowchart of FIG. 8 is performed.

Figure 8:
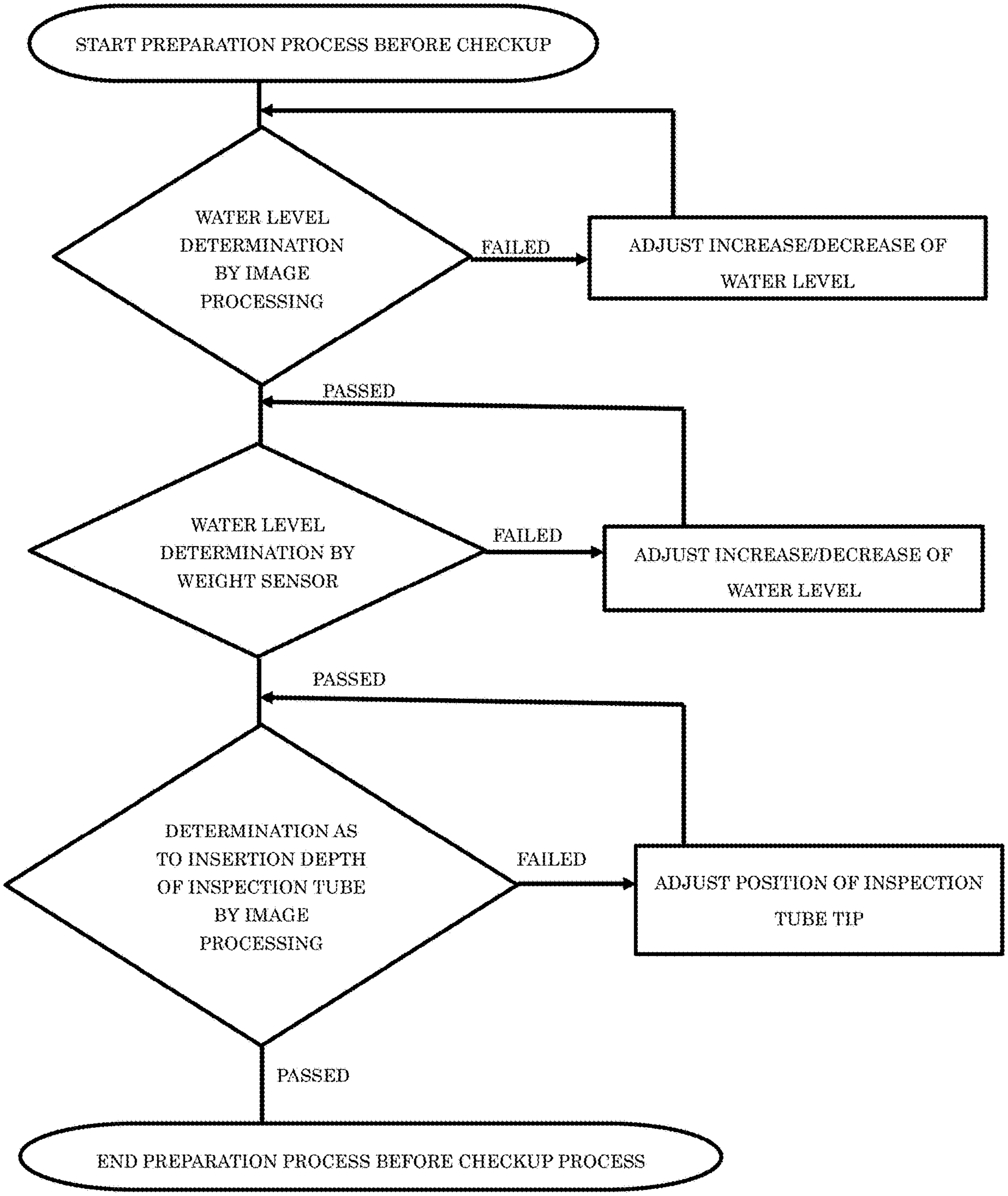
FIG. 8 is a flowchart representing a preparation process in the checkup process of FIG. 6.

In FIG. 8, the preparation process before the checkup process is performed to check whether the inspection device main body 1 as a device for downward displacement of water is normally functioning, and includes at least a water level determination by image processing by the image recognition camera 12, a water level determination by the weight sensor 24, and a determination as to the insertion depth of the inspection tube 21 by image processing by the image recognition camera 12. As a preparation process, it is only required to perform any or all of these determinations. In the present embodiment, all of these determinations are sequentially performed.

In the preparation process, a water level determination by image processing is made based on a communication state of the flow paths of the circuit switching part 23 and the switching valves 30 and 31 depicted in FIG. 1. Here, the inspection tube 21 is in a state of moving above the operation mechanism part 26 to cause the inspection tube tip 21*a* to be exposed to the atmosphere.

A water level determination by image processing is made by taking an image of the water surface of water W inside the container 22 by the image recognition camera 12 once and recognizing the position of the water surface based on a difference in luminance from the non-reflective material 29 on the back surface side of the container 22 or the non-reflective paint 32 provided on the inner wall 1*a*.

The image-taken water level in the container 22 is compared with a standard water level set in advance. When the water level is within a predetermined range with respect to the standard water level, a determination is made as passed. In this case, a water level determination by the weight sensor 24 is made next. When the image-taken water level is not within the predetermined range, a determination is made as failed. In this case, water W is infused into or discharged from the container 22 to perform an increase/decrease adjustment of the water level, and then a water level determination by image processing is made again and is repeated until this water level determination by image processing passes.

The water level determination by the weight sensor 24 is made by the weight sensor 24 measuring the container 22 with water W flowing thereinto. The measured weight of the container 22 (including water W) is compared with a standard weight set in advance and, when the weight is within the range of the standard weight, a determination is made as passed. In this case, a large-leak determination by the flow sensor 25 is made next. When the measured weight is not within a predetermined range, a determination is made as failed. In this case, as with the water level measurement by image processing, water W is infused into or discharged from the container 22 to perform an increase/decrease adjustment of the water level, and then a water level determination by the weight sensor 24 is made again and is repeated until this water level determination by the weight sensor 24 passes.

Since there is a possibility that the water level of water W in the container 22 changes after several minutes due to evaporation or the like, it is required to check the water level frequently. By making the above-described water level determination by image processing and water level determination by the weight sensor 24, the water level in the container 22 is checked with double determination criteria based on vision and weight to be adjusted with high accuracy, thereby preventing its change.

The large-leak determination by the flow sensor 25 is made in a communication state of the flow paths of the circuit switching part 23 and the switching valve 30 depicted in FIG. 2. Here, the inspection tube tip 21*a* maintains a state of exposure to the atmosphere. Air from the test valve 20 flows to a direction indicated by an arrow. When the flow of air is detected by the flow sensor 25, a determination is made as passed. In this case, a determination as to the insertion depth of the inspection tube 21 is made by image processing. When the flow of air is not detected by the flow sensor 25, a determination is made as failed. In this case, after adjustment and checkup of the flow sensor 25 and a leak check are performed, a large-leak determination by the flow sensor 25 is made again and is repeated until this large-leak determination by the flow sensor 25 passes.

The above-described large-leak determination by the flow sensor 25 is made to reliably capture a leak from the inspection tube tip 21*a* by the image recognition camera 12 at the time of the checkup process and the inspection process, which are described further below.

That is, in the checkup process and the inspection process described further below, since images of bubbles appearing from the inspection tube tip 21*a* are taken by the image recognition camera 12 as still images at predetermined interval, when a leak from the inspection tube tip 21*a* has a small flow rate, a period from a time when bubbles occurring at the inspection tube tip 21*a* appear to a time when they become afloat is long. Thus, even if images are taken at intervals of several seconds, a leak can be reliably detected.

On the other hand, when a leak from the inspection tube tip 21*a* has a large flow rate (large leak), the period from the time when bubbles occurring at the inspection tube tip 21*a* appear to the time when they become afloat is short. Thus, when images are taken at intervals of several seconds, there is a possibility that bubbles become afloat during image taking or at the instant of image taking and a leak cannot be detected.

For this reason, a leak detection by image processing on the inspection tube tip 21*a* is not suitable for detecting a leak with a large flow rate. To address this, a large-leak determination by the flow sensor 25 is made at the stage of the preparation process.

The determination as to the insertion depth of the inspection tube 21 by image processing is to check whether the linear servo mechanism (operation mechanism part) 26 normally operates and the inspection tube tip 21*a* is at a predetermined position into water in the container 22. The determination is made by moving the inspection tube 21 from the state of FIG. 2 downward by the operation mechanism part 26 and inserting the tube into water and taking an image of the inspection tube tip 21*a* once by the image recognition camera 12.

When the insertion depth of the inspection tube tip 21*a* from the water surface is within a predetermined range (when the inspection tube tip 21*a* is at a depth within a predetermined range), a determination is made as passed. In this case, all determination times in the preparation process are determined as passed, causing the preparation process to end. When the insertion depth is not within the predetermined range, a determination is made as failed. In this case, after the inspection tube tip 21*a* is adjusted by the operation mechanism part 26 so as to descend to a correct position, a determination as to the insertion depth of the inspection tube 21 by image processing is made again and is repeated until the insertion depth determination passes.

After the above-described preparation process before the checkup process passes, the inspection tube 21 is moved upward by the operation mechanism part 26 to be in a state of being exposed to the atmosphere. Then, the communication state of the flow rate of the circuit switching part 23 and the switching valves 30 and 31 is switched to one depicted in FIG. 4 to blow low-pressure air from the low-pressure air blowing part 27 to the inspection tube 21 to discharge water W attached to the inspection tube tip 21*a*.

Next, the checkup process depicted in the flowchart of FIG. 6 is performed.

In the checkup process, as depicted in FIG. 3, a dummy valve or the test valve 20 is attached to the first branch path 4 with the jig 13 to cause the valve to be in an open state, and the circuit switching part 23 of the air circuit 2 and the switching valves 30 and 31 in the inspection device main body 1 are switched to configure the checkup circuit 10 so that air proceeds to an arrow direction.

In the checkup circuit 10, when air of 0.2 mL/min is supplied from the flow standard 3, the air proceeds to the arrow direction. Here, a pass/fail determination is made by the image recognition camera 12 as to whether bubbles appear from the tip 21*a* of the inspection tube 21 in the checkup time, thereby performing the checkup process.

In this case, first, with a step of moving the inspection tube 21 downward by the operation mechanism part 26 for insertion into water, the inspection tube tip 21*a* is inserted into water. In this state, an image of the inspection tube tip 21*a* is taken by the image recognition camera 12.

Here, the maximum number of times of image-taking is set at N (times), the number of times of image-taking increasing until the number of times reaches the maximum number of times of image-taking N is set at X (times), and this number of times of image-taking X is counted. The maximum number of times of image-taking N is decided by the number of times of image-taking X equivalent to an inspection time to be set. In the present embodiment, it is assumed that an image-taking interval by the image recognition camera is set at one second and this is repeated thirty times (thirty seconds) at maximum. That is, the number of times of image-taking X increases every second, and this image-taking is repeated until the number of times of image-taking reaches thirty, the maximum number of times of image-taking N. It is assumed that these maximum number of times of image-taking N and image-taking interval are set as appropriate along the inspection procedure to be optimized.

A determination as to a change in the taken image of the inspection tube tip 21*a* is made by recognizing, in the image taken by the image recognition camera 12, bubbles appearing from the inspection tube tip 21*a* and a difference in luminance from that of the non-reflective material 29 or the non-reflective paint 32. The flow standard 3 is for a so-called pseudo leak assuming a case in which a leak occurs form the test valve 20 in the inspection process. And, when air from the flow standard 3 appears as bubbles from the inspection tube tip 21*a*, that is, when a change is observed in the taken image, a determination is made as "changed" to confirm that the state is such that the inspection process described further below can be normally performed, and the test valve is determined as passing the inspection process even at a stage in which the number of times of image-taking X does not reach the maximum number of times of image-taking N (X<N).

In this case, a step of moving the inspection tube 21 upward by the operation mechanism part 26 to evacuate its tip 21*a* from water to expose the inspection tube 21 to the atmosphere causes its tip 21*a* side and the atmosphere to communicate each other.

After a step of exposure to the atmosphere, the circuit switching part 23 of the air circuit 2 and the switching valves 30 and 31 in the inspection device main body 1 are switched to the state depicted in FIG. 4, and ultra-low-pressure air equal to or lower than 0.1 MPa is blown as indicated by arrows from the low-pressure air blowing part 27 for one second or shorter to the inspection tube 21 to discharge water W attached to the inspection tube tip 21*a*. With this, after the ascent of the inspection tube 21, water droplets attached to its tip 21*a* and inner water W are removed to cause a clear state, and water droplets are prevented from being sucked into the inspection tube 21. With this, in the following processes, there is no possibility that residual droplets delay the occurrence of a leak from the inspection tube tip 21*a*.

On the other hand, when bubbles do not appear from the inspection tube tip 21*a*, that is, when no change is observed in the taken image, a determination is made as "no change", and the process proceeds to confirmation of the number of times of image-taking X. Then, when the number of times of image-taking X does not reach the maximum number of times of image-taking N, a determination is made as X<N, and image-taking is repeatedly performed in a similar manner.

Upon confirmation of the number of times of image-taking X, when the number of times of image-taking X reaches the same value as the maximum number of times of image-taking N (the number of times of image-taking X=the maximum number of times of image-taking N), it is determined as failed in the checkup process, indicating an abnormal state in which the inspection device main body 1 cannot cause air from the flow standard 3 to appear as bubbles from the inspection tube tip 21*a* within a predetermined period of time.

When a determination is made as failed in the checkup process, the flow rate of the flow standard 3 does not appear as air bubbles, or cannot be confirmed. As measures or confirmation after a determination is made as failed, it is confirmed, for example, whether the air circuit 2 is clogged with oil or the like, whether a hole is open or there is a damage in the course of the air circuit 2, whether the test valve 20 is normally clamped by the jig 13 (whether there is no gap between the flow path of the test valve 20 and the jig 13), whether the image recognition camera 12 normally operates, whether any of the circuit switching part 23 and the switching valves 30 and 31 is failed, or the like, and appropriate measures are taken in accordance with that result.

It is assumed that, after measures are taken and confirmation is performed, the checkup process is performed again from the first time of the number of times of image-taking and the process proceeds to the preparation process and the inspection process only when a determination is made as passed in the checkup process.

Figure 9:
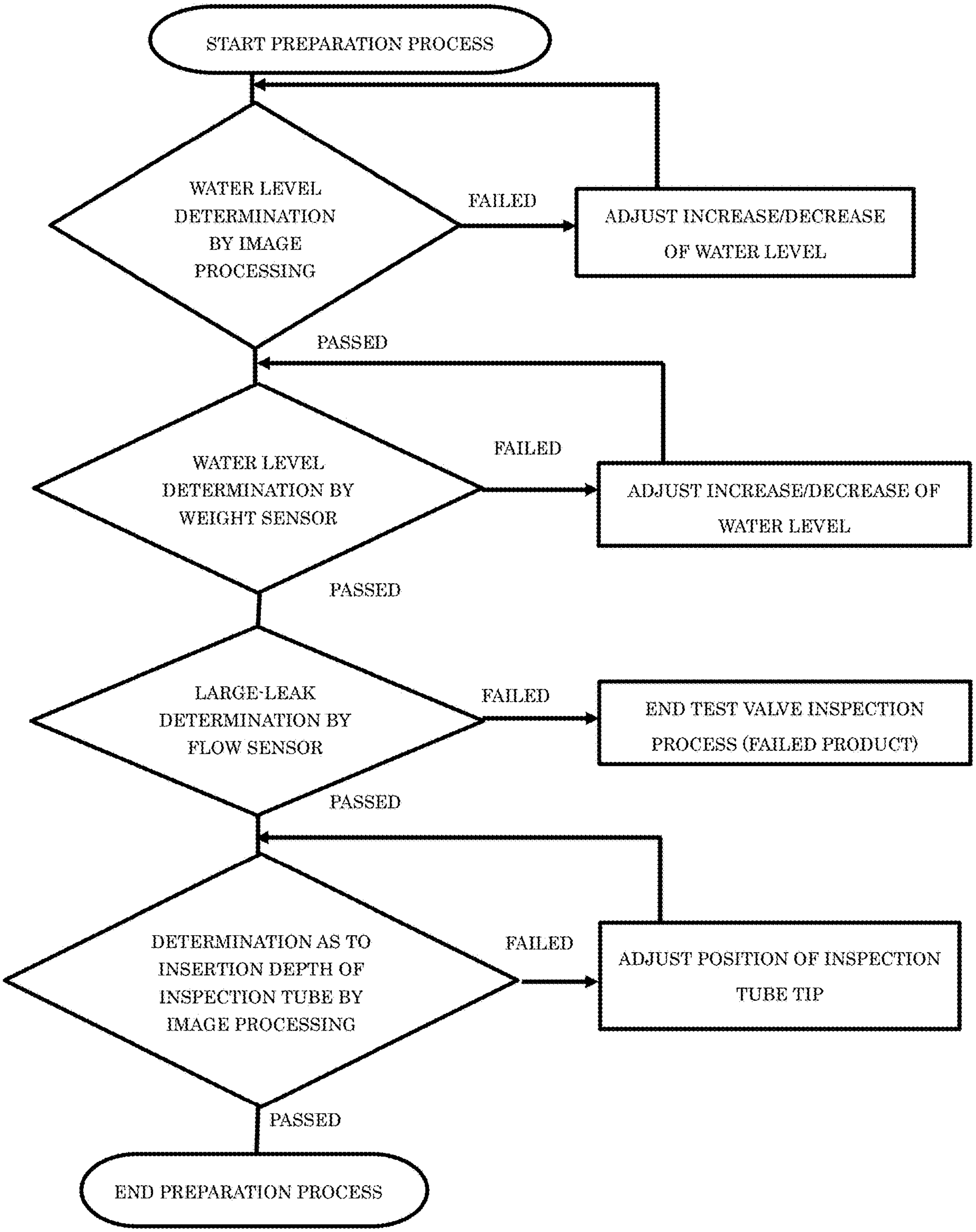
FIG. 9 is a flowchart representing a preparation process in the inspection process of FIG. 7.

In FIG. 9, a flowchart of the preparation process before the inspection process is depicted. The preparation process includes, as with one before the checkup process, at least a water level determination by image processing by the image recognition camera 12, a water level determination by the weight sensor 24, a large-leak determination by the flow sensor 25, and a determination by image processing by image recognition camera 12 as to the inspection depth of the inspection tube 21. As with the preparation process, among these determinations, it is only required to make any or all determinations. In the present embodiment, all of these determinations are sequentially made.

In the preparation process before the inspection process, a water level determination by image processing, a water level determination by the weight sensor 24, and a determination by image processing as to the insertion depth of the inspection tube 21 are made in a manner similar to the preparation process before the checkup process. A large-leak determination by the flow sensor 25 is different from the one in the preparation process before the checkup process in process after a determination is made as failed.

When a large-leak determination by the flow sensor 25 in the preparation process before the inspection process is made as failed, it is regarded that a large leak has occurred from the test valve 20, and the test valve 20 is determined as a product failing the valve seat inspection test. In this case, the process does not proceed to the inspection process, and an inspection of a different test valve 20 can be made.

When the test valve passes all of the determination items of a water level determination by image processing, a water level determination by the weight sensor 24, a large-leak determination by the flow sensor 25, and a determination by image processing as to the inspection depth of the inspection tube 21, the test valve is regarded as passing the preparation process, and the preparation process ends.

After the test valve passes the preparation process, the inspection tube 21 is moved upward by the operation mechanism part 26 to cause a state of exposure to the atmosphere. Then, switching is made to a communication state of the flow rate of the circuit switching part 23 and the switching valves 30 and 31 depicted in FIG. 4, low-pressure air is blown from the low-pressure air blowing part 27 to the inspection tube 21 to discharge water W attached to the inspection tube tip 21*a*, and then the inspection process is performed.

Figure 7:
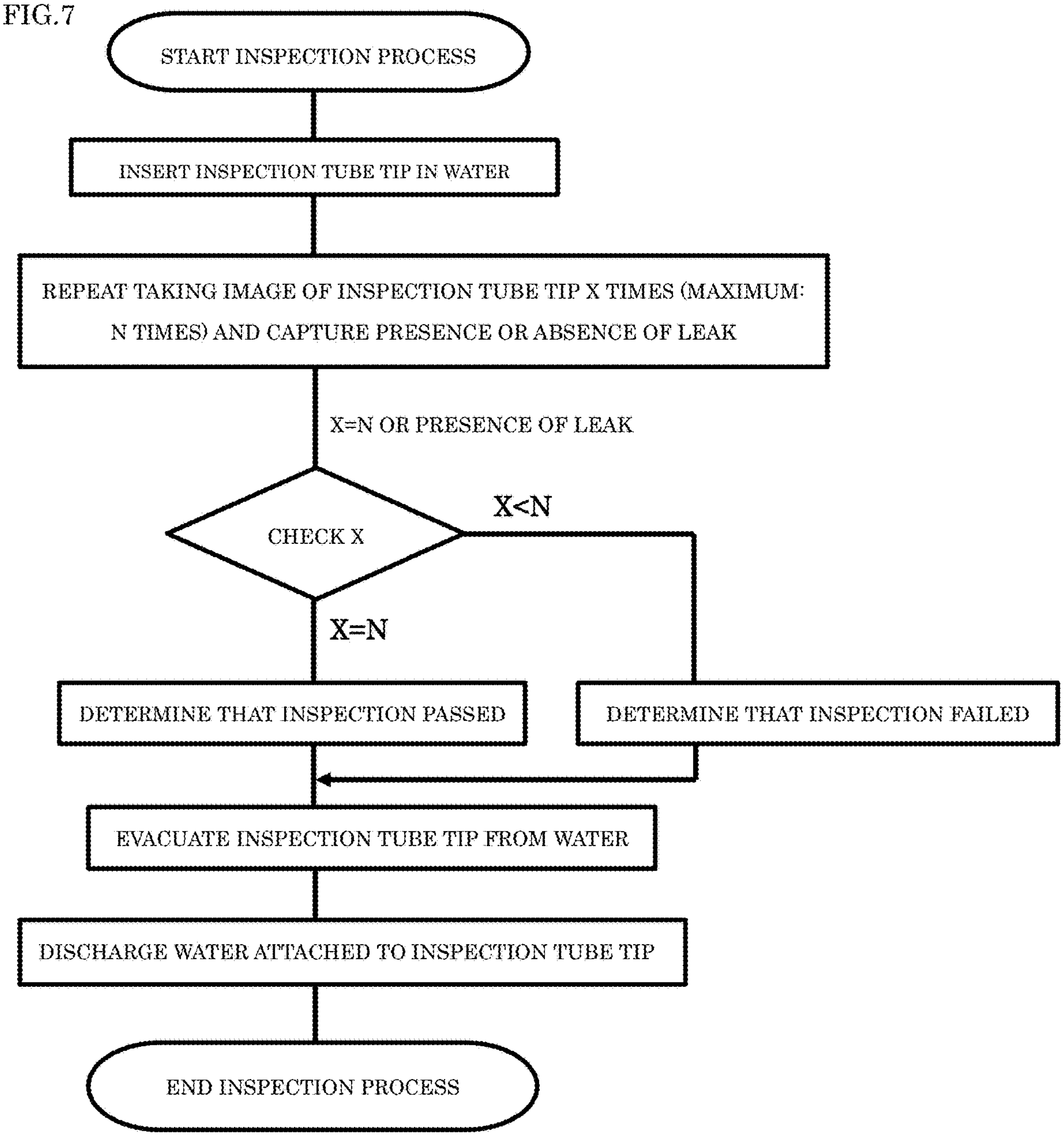
FIG. 7 is a flowchart representing an inspection process in the valve seat inspection method using the image recognition camera of the present invention.

In a flowchart depicted in FIG. 7, the inspection process is depicted from start to end. In the inspection process, in FIG. 5, if a dummy valve is attached in the checkup process, it is removed. In a state in which the test valve 20 in a valve-closed state with pressure encapsulated inside the cavity attached to the first branch path 4 of the air circuit 2 with the jig 13, the circuit switching part 23 of the air circuit 2 and the switching valves 30 and 31 in the inspection device main body 1 are switched to configure the inspection circuit 11 in which air proceeds to arrow directions.

In the inspection circuit 11, air leaking from a valve seat side of the test valve 20 in a valve-closed state proceeds from its both sides through the inside of the jig 13 to arrow directions. Here, the inspection process is performed by determining by the image recognition camera 12 whether bubbles appear from the inspection tube tip 21*a* in an inspection time to make a pass/fail determination.

In this case, as with the case of the checkup process, the inspection tube tip 21*a* is inserted into water and, in this state, it is assumed that, with the number of times of image-taking X (times) and the maximum number of times of image-taking N (times), an image of the inspection tube tip 21*a* is taken (triggered) by the image recognition camera 12. As with the checkup process, it is assumed that the number of times of image-taking X increases for every second and image-taking is repeated until the number of times of image-taking reaches the maximum number of times of image-taking N, that is, thirty times (thirty seconds).

A determination as to a leak from the inspection tube tip 21*a* is made also in a manner similar to the checkup process by recognizing a difference in luminance between bubbles appearing from the inspection tube tip 21*a* and the non-reflective material 29 and the non-reflective paint 32. When bubbles do not appear from the inspection tube tip 21*a*, that is, no leak is observed, in the leak determination, a determination is made as "no leak", and image taking is repeated in a similar manner. Then, at the time of checking the number of times of image-taking X, when the number of times of image-taking X reaches a value equal to the maximum number of times of image-taking N (the number of times of image-taking X=the maximum number of times of image-taking N), a determination is made in which no valve seat leak is observed in a time shorter than a predetermined inspection time and the test valve passes the inspection process.

On the other hand, when bubbles appear from the inspection tube tip 21*a*, that is, a leak is observed, a determination is made as "a leak has occurred" and, even in a state in which the number of times of image-taking X is smaller than the maximum number of times of image-taking N (the number of times of image-taking X<the maximum number of times of image-taking N), a determination is made in which a valve seat leak has occurred in a time shorter than the predetermined inspection time and the test valve fails the inspection process. In this case, the test valve 20 is a product failing the valve seat inspection.

In either case, pass or fail, of the valve seat inspection, the inspection tube 21 is moved upward by the operation mechanism part 26, and its tip 21*a* is evacuated from water to be communicated with the atmosphere and be exposed to the atmosphere.

After exposure of its tip 21*a* to the atmosphere, the circuit switching part 23 of the air circuit 2 and the switching valves 30 and 31 in the inspection device main body 1 are switched to the state depicted in FIG. 4, and ultra-low-pressure air equal to or lower than 0.1 MPa is blown from the low-pressure air blowing part 27 to the inspection tube 21 for one second or shorter to discharge water W attached to the inspection tube tip 21*a*. With this, water droplets attached to the inspection tube tip 21*a* and inner water W are removed to prevent water droplets from been sucked up inside the inspection tube 21 and, when another test valve 20 is inspected next, there is no possibility that residual water droplets delay the occurrence of a leak from the inspection tube tip 21*a*.

After the valve seat inspection of one test valve 20 is performed, a valve seat inspection of a different test valve 20 can be performed next. In this case, as described above, before the inspection process is performed, the checkup process is performed only once and, once the checkup process ends, the inspection process can be repeated successively.

Note that while a ball valve is used as the test valve 20 in the above-described embodiment, a valve seat inspection can be performed in a manner similar to the above also by taking a valve other than a ball valve as a test valve. When a ball valve is taken as the test valve 20, in a state in which pressure is encapsulated in the cavity, valve seat leaks from both sides are detected to make a pass/fail determination. It is also possible to apply a predetermined pressure for inspection from a primary side of the test valve 20 in a valve-closed state and make a pass/fail determination based on a valve seat leak from a secondary side.

Also, while the inspection time is set at thirty seconds (the number of times of image-taking is thirty times), the inspection time can be changed as appropriate depending on the length of the air circuit 2 of the inspection device main body 1 or the like. Thus, it is also possible to shorten the air circuit 2 to shorten the time taken for the preparation process, the checkup process, and the inspection process.

Furthermore, the image-taking interval may be shortened or lengthened as appropriate in accordance with the speed of appearance of bubbles from the inspection tube tip 21*a* with a reference leak amount, the inner diameter of the inspection tube 21, or the like.

The valve seat inspection method using the image recognition camera of the present invention includes the inspection device main body 1 having the checkup circuit 10, the inspection circuit 11, and the image recognition camera 12, and the inspection device main body goes through the checkup process and the inspection process by switching the circuit switching part 23. In these checkup process and inspection process, each in thirty seconds, a pass/fail determination is made by the image recognition camera 12 as to whether subtle bubbles appear from the inspection tube tip 21*a*. Thus, without requiring a flow sensor with high accuracy for measuring a subtle flow rate and by using the simple, general-purpose image recognition camera 12 such as an industrial camera, even a subtle leak amount that cannot be detected by a general-purpose flow sensor can also be detected by the inspection device main body 1 in a simple structure with high accuracy and ease, and valve seat inspections can be performed successively and accurately by automation. Neither visually inspecting bubbles from the inspection tube tip 21*a* nor measuring the size of bubbles by the image recognition camera 12 is required, and it is only required to detect only the appearance of bubbles in the predetermined inspection time. Thus, an inspection can be more easily performed by a simple inspection.

As described above, it is possible to achieve inspection accuracy equivalent to that when a valve seat inspection is visually performed by visual inspection by using the image recognition camera 12. From this, for example, it is possible to provide a valve seat inspection method and a valve seat inspection device along standards defined in "Valve Inspection and Testing" of API (American Petroleum Institute).

In these standards, it is accepted that a device for measuring a visually detectable leak can be replaced by a measurement device and, as a measurement device for this purpose, for example, "Volimetric Device" is suggested. In "Volimetric Device", the number of bubbles per unit time (bubbles/min) is visually measured.

In contrast to this, the inspection device main body 1 of the present invention, processes including an inspection process and a checkup process are performed. In each process, the presence or absence of appearance of bubbles in a checkup time is checked by using the image recognition camera 12 to make a pass/fail determination, thereby improving accuracy of valve seat leak inspection.

Furthermore, in each process, a step of inserting the inspection tube tip 21*a* into water and a step of exposing the inspection tube tip 21*a* to the atmosphere are operated by the operation mechanism part 26. Thus, unlike the case as in the above-described measurement device in which the tube is always in a state of being inserted, the device is not always influenced by atmospheric pressure. Thus, in a state in which the influence of atmospheric pressure is suppressed as much as possible, bubbles from the inspection tube 21 by air of the air circuit 2 can be caused to appear with a correct flow rate. Attaching and removing the test valve 20 with the inspection tube 21 in a state of being exposed to the atmosphere also prevents changes in pressure in the air circuit 2 due to the attachment and removal.

Also, as an upstream process of each of the checkup process and the inspection process, a water level determination by image processing, a water level determination by the weight sensor 24, a large-leak determination by the flow sensor 25, and a determination by image processing as to the insertion depth of the inspection tube 21 are made. Thus, before the checkup process and the inspection process, it is checked whether the inspection device main body 1 is normally functioning, thereby improving accuracy of these checkup process and inspection process.

Figure 10:
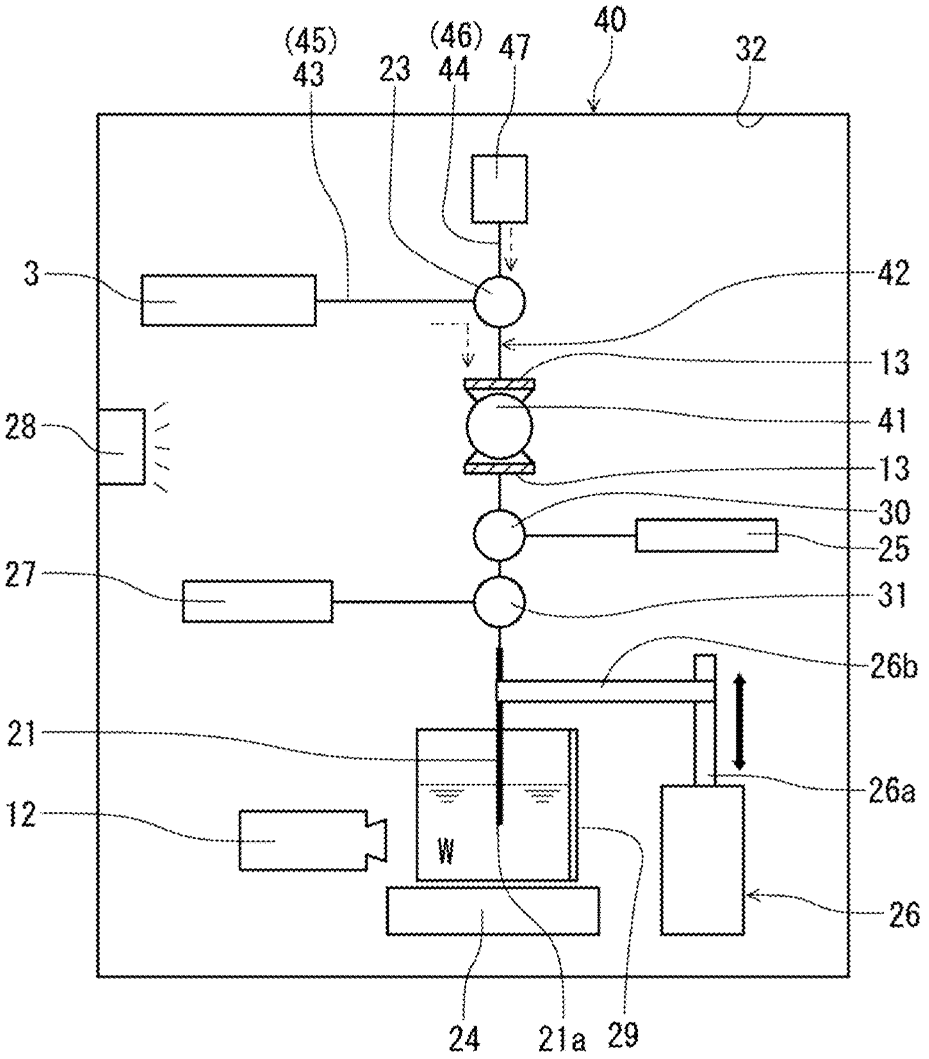
FIG. 10 is a circuit diagram depicting another embodiment of the valve seat device.

In FIG. 10, another embodiment of the valve seat inspection device is depicted. Note in the embodiment that portions identical to those of the above-described embodiment are indicated by the same reference character and description of these portions are omitted.

In an inspection device main body 40 of the embodiment, a predetermined inspection pressure is applied from a primary side of a test valve 41 in a valve-closed state and, with the inspection pressure, a pass/fail determination is made from a valve seat leak occurring from a secondary side.

On a primary side of an air circuit 42 configuring the inspection device main body 40, a checkup pressure supply path 43 and an inspection pressure supply path 44 are provided via the circuit switching part 23 so that switching between flow paths of the checkup pressure supply path 43 and the inspection pressure supply path 44 can be made by the circuit switching part 23. In the inspection device main body 40, a checkup circuit 45 or an inspection circuit 46 is provided so as to be configured by switching by the circuit switching part 23. In the embodiment, depiction of a switching state of the flow paths of the circuit switching part 23 and the switching valves 30 and 31 is omitted.

The checkup circuit 45 is configured by a state in which the circuit switching part 23 is switched to cause the flow standard 3 provided on a primary side of the checkup pressure supply path 43 and a test valve 41 side to communicate each other. With the checkup circuit 45, a leak with a reference leak amount in a flow path indicated in an arrow direction indicated by a one-dot-chain line can be checked.

The inspection circuit 46 is configured by a state in which the circuit switching part 23 is switched to cause the inspection pressure supply part 47 provided on a primary side of the inspection pressure supply path 44 and a test valve 41 side to communicate each other. With the switching of the inspection circuit 46, a valve seat leak of the test valve in a flow path indicated in an arrow direction indicated by a two-dot chain line can be inspected.

Immediately subsequently to the circuit switching part 23, the jig 13 formed of a clamp member is provided. With the jig 13, the test valve 41 is connectably provided.

The inspection device main body 40 is provided so that both ends of the test valve 41 is clamped by the jig 13, pressure is applied from the primary side of the test valve 41 in a valve-closed state, and a valve seat leak flowing out from the secondary side is determined by the image recognition camera 12 to allow a pass/fail determination to be made.

The test valve 41 is formed of, for example, a ball valve, and, in particular, the embodiment is suitable when a ball valve of a relatively large size is subjected to a valve seat inspection.

When the preparation process is performed by the above-described inspection device main body 40, in FIG. 10, a water level determination by image processing by the image recognition camera 12, a water level determination by the weight sensor 24, a large-leak determination by the flow sensor 25, and a determination by image processing by the image recognition camera 12 as to the insertion depth of the inspection tube 21 are performed in a manner similar to the above before the checkup process and before the inspection process.

Next, when the checkup process is performed, the circuit switching part 23 is switched to configure the checkup circuit 45 in a state in which the checkup pressure supply path 43 communicates via the test valve 41 to the inspection tube 21, and a checkup is performed in a manner similar to the above.

Furthermore, when the inspection process is performed, the circuit switching part 23 is switched to cause a state in which the inspection pressure supply path 44 communicate through the test valve 41 up to the inspection tube 21 to configure the inspection circuit 46, and an inspection is performed in a manner similar to the above.

Through these checkup process and inspection process, a valve seat inspection of the test valve 41 using the inspection device main body 40 is completed, and a pass/fail determination on the test valve 41 can be correctly made. Furthermore, it is possible to subsequently perform a valve seat inspection on a different test valve 41 in a similar manner.

While the embodiments of the present invention have been described in detail above, the present invention is not limited by the description of the above-described embodiments and can be variously modified in a range not deviating from the spirit of the invention described in the claims of the present invention.

REFERENCE SIGNS LIST

1 inspection device main body
1*a* inner wall
10 checkup circuit
11 inspection circuit
20 test valve
21 inspection tube
22 container
21*a* tip
12 image recognition camera
23 circuit switching part
24 weight sensor
25 flow sensor
26 linear servo mechanism (operation mechanism part)
27 low-pressure air blowing part
32 non-reflective paint
W water

The invention claimed is:

1. A valve seat inspection method using an image recognition camera, wherein an inspection device main body is provided including a checkup circuit for checking a leak with a reference leak amount, an inspection circuit in a state in which a test valve is set, and the image recognition camera for taking an image of bubbles appearing from a tip of an inspection tube being inserted into water in a container, the inspection device main body goes through a checkup process of switching a circuit switching part and making a pass/fail determination by the image recognition camera as to whether bubbles appear from the tip of the inspection tube in a checkup time and an inspection process of switching the circuit switching part and making a pass/fail determination by the image recognition camera as to whether bubbles appear from the tip of the inspection tube in an inspection time.

2. The valve seat inspection method using the image recognition camera according to claim 1, wherein as an upstream process of each of the checkup process and the inspection process, at least any or all of a water level determination by image processing, a water level determination by a weight sensor, a large-leak determination by a flow sensor, and a determination by image processing as to insertion depth of the inspection tube are performed.

3. The valve seat inspection method using the image recognition camera according to claim 1, wherein low-pressure air is blown to the inspection tube to discharge water attached to the inspection tube tip.

4. The valve seat inspection method using the image recognition camera according to claim 1, wherein a step of inserting the tip of the inspection tube into water and a step of exposing the tip of the inspection tube to atmosphere are operated by an operation mechanism part.

5. The valve seat inspection method using the image recognition camera according to claim 1, wherein a non-reflective paint for preventing light reflection is applied to the inspection device main body and its inner wall to obtain detection capability of the image recognition camera.

6. A valve seat inspection device using the image recognition camera, the device comprising: a checkup circuit for checking a leak with a reference leak amount; an inspection circuit in a state in which a test valve is set; the image recognition camera for taking an image of bubbles appearing from a tip of an inspection tube communicating the inspection circuit in a state of being inserted into a container filled with water; a circuit switching part for switching between the checkup circuit and the inspection circuit; and an operation mechanism part for inserting the inspection tube into water and exposing the inspection tube to atmosphere.

7. The valve seat inspection device using the image recognition camera according to claim 6, wherein the image recognition camera makes at least a leak determination based on presence or absence of bubbles appearing from the tip of the inspection tube, a water level determination in the container, and a determination as to insertion depth of the inspection tube.

8. The valve seat inspection device using the image recognition camera according to claim 6, wherein the operation mechanism part is a vertically-operative linear servo mechanism.

9. The valve seat inspection device using the image recognition camera according to claim 6, wherein a low-pressure air blowing part is provided to the inspection tube to discharge water attached to the tip of the inspection tube.

* * * * *